United States Patent [19]
Wang et al.

[11] Patent Number: 6,148,418
[45] Date of Patent: Nov. 14, 2000

[54] COMPUTER ENVIRONMENT MONITOR DEVICE

[75] Inventors: Min-Kun Wang; Fang-Diahn Guo, both of Hsinchu; Wen-Ping Cheng, TaoYuan; Chi-Ho Hsu, Taipei, all of Taiwan

[73] Assignee: Holtek Semiconductor Inc., Taiwan

[21] Appl. No.: 09/102,410

[22] Filed: Jun. 22, 1998

[51] Int. Cl.[7] .............................. G06F 11/30; G06F 15/20

[52] U.S. Cl. ................................................ 714/25; 714/47

[58] Field of Search ............................. 714/25, 47, 46, 714/27, 32

[56] References Cited

U.S. PATENT DOCUMENTS

| | | | |
|---|---|---|---|
| 4,823,290 | 4/1989 | Fasack et al. | 364/550 |
| 5,367,670 | 11/1994 | Ward et al. | 714/47 |
| 5,566,339 | 10/1996 | Perholtz et al. | 713/340 |
| 5,761,085 | 6/1998 | Giorgio | 702/33 |

*Primary Examiner*—Ly V. Hua

[57] ABSTRACT

An environment monitoring integrated circuit is provided that allows the boundaries of operating parameters to be conveniently modified. The present invention allows the hardware designer to easily change the temperature boundary of the computer operation, or the boundaries of the operating voltage, the operating temperature and the rotation speed of the fan. The present invention uses limit registers which provide a simple implementation for changing the boundaries of the operating parameters of the computer.

20 Claims, 7 Drawing Sheets

COMPUTER ENVIRONMENT MONITOR DEVICE

BACKGROUND OF THE INVENTION

1. Field of the Invention

The present invention relates to an environment monitoring integrated circuit with an embedded micro-controller for a computer, and more particularly, to a circuit which allows the computer system designer to change the monitoring procedure and method, by simply of modifying the boundaries of a set of operating parameters.

2. Background of the Invention

It is important to detect certain environment conditions of a running computer. For example, when the computer is working, the rotational speed of the fan must be checked, the temperature of the computer system environment and the operation voltage level also must be checked. If one of these environment parameters exceeds the preset boundaries or value, the computer sends out alarm for user to take action that would avoid further damage to the computer. The computer can also be designed to cut off the power source directly when one of the environment parameters exceeds the preset boundary or value.

Conventional environment monitoring integrated circuits, generally use the ASIC (Application Specific Integrated Circuits) technology and peripheral hardware circuitry to achieve the requirements of the application. Since the ASIC technology uses hardware circuitry to set the boundaries for the operating parameters, these boundaries are difficult to change. It is inconvenient for the system hardware designer to change the method of monitoring an operating parameter or to sample data relating thereto, because it is necessary to revise the hardware circuit design. Moreover, if there are many operating parameters to be changed, then more hardware circuitry will be necessary.

Thus, there still remains a need for an environment monitoring integrated circuit which overcomes the drawbacks of the conventional environment monitoring integrated circuit, and which provides a convenient method for changing the procedure and method of monitoring an operating parameter.

SUMMARY OF THE INVENTION

For obviating the afore mentioned problem and drawbacks found in the conventional devices, it is the primary object of the present invention to provide an environment monitoring integrated circuit that allows the boundaries of operating parameters to be conveniently modified. The present invention allows the hardware designer to easily change the temperature boundary of the computer operation, or the boundaries of the operating voltage, the operating temperature and the rotation speed of the fan. The present invention uses limit registers which provide a simple implementation for changing the boundaries of the operating parameters of the computer.

It is another object of the present invention to provide an environment monitoring integrated circuit having a reduced hardware implementation but which allows the designer to easily and conveniently change the boundaries of the operating parameter.

It is another object of the present invention to provide an environment monitoring integrated circuit which reduces the cost of the circuitry.

In order to accomplish the objects of the present invention, the present invention includes an embedded micro-controller used for revising the monitoring method of the computer operation. The embedded microcontroller controls the revision of the main relative operating parameters of a normal computer, such as the operating voltage, the operating temperature and the rotation speed of the fan. The present invention also includes an analog/digital converter coupled to the embedded microcontroller. The analog/digital converter converts the analog operating voltage and operating signals into digital signals, and then sends out the digital signals to the embedded micro-controller. The present invention also includes a fan counter for counting the rotation speed of the fan, with the fan counter coupled to the embedded micro-controller for providing information about the rotation speed to the micro-controller.

The embedded micro-controller has a first output coupled to an interrupt control circuit for producing interrupt signals, and a second output coupled to a beep control circuit for producing a beep signal. The beep signal sounds an alarm when one of the operating parameters exceeds the present boundary. The present invention also includes an ISA/Serial bus interface for reading or writing the relative operating parameters, and includes a set of configuration registers for storing the relative operating parameters.

In order that the present invention may more readily be understood, the following description is given, merely be the way of example, reference being made to the accompanying drawings, wherein:

DETAILED DESCRIPTION OF THE PREFERRED EMBODIMENT

The present invention relates to an environment monitoring integrated circuit, which allows the user to change the boundaries of certain operating parameters of the computer.

Figure 1:
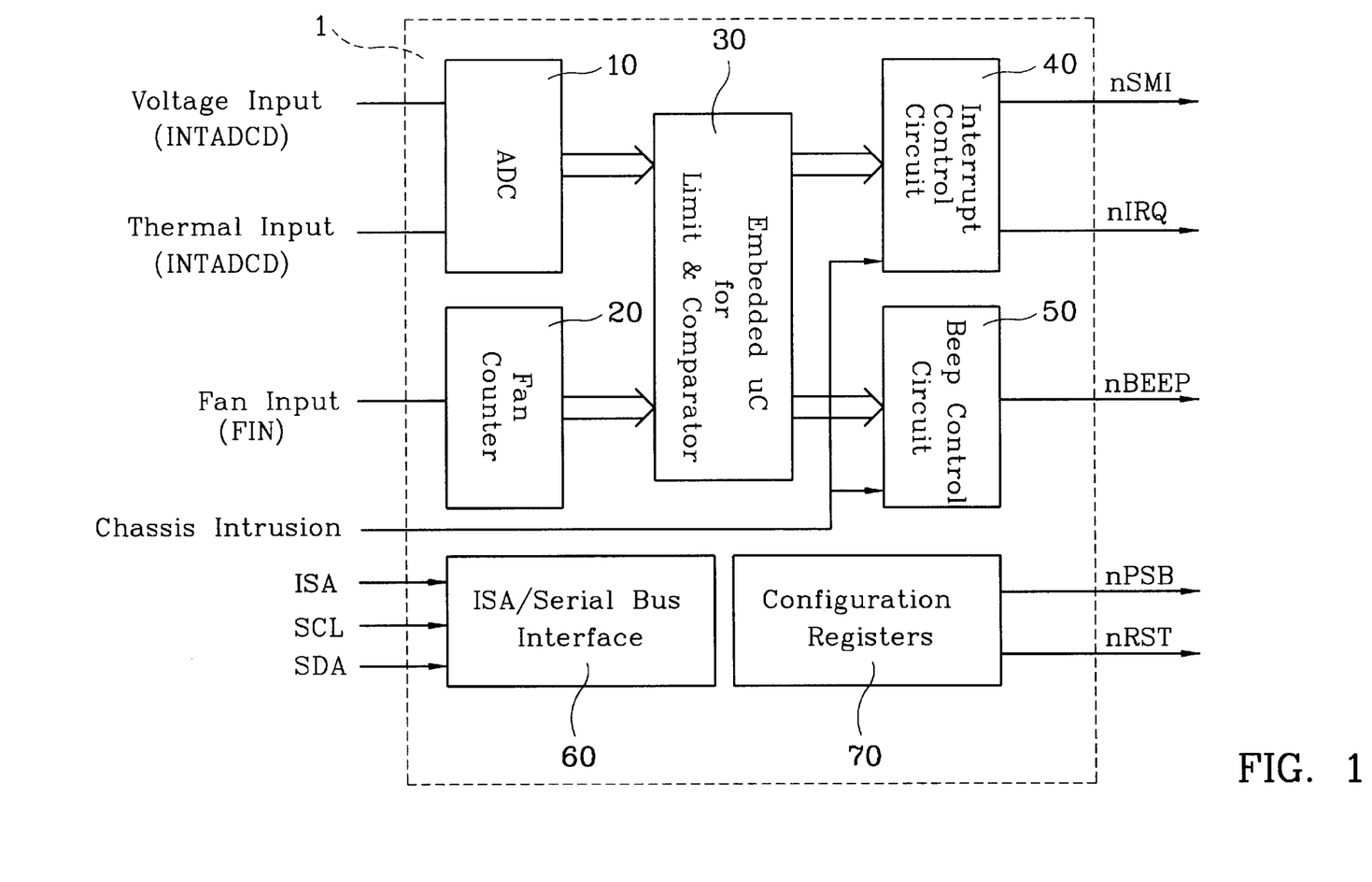
FIG. 1 is a schematic block diagram of an embodiment according to the present invention.

FIG. 1, illustrates a schematic block diagram of one embodiment of an environment monitoring integrated circuit according to the present invention. The circuit 1 includes an analog/digital converter 10 having inputs coupled to a voltage input signal and a thermal input signal. The voltage input signal represents the operating voltage of the computer, and the thermal input signal the operating temperature of the computer. The analog/digital converter 10 converts the analog voltage input signal and thermal input signal into a set of digital signals, and then sends out these digital signals to an embedded micro-controller 30. The embedded micro-controller 30 includes limit registers which allow the user to conveniently change certain boundaries of the computer operation. For example, if the user wants to increase the boundary of the operating voltage, the user can change the boundary by simply amending the values of a limit register in the embedded micro-controller 30. The circuit 1 also includes a fan counter 20 coupled to the embedded micro-controller 30 for counting the signals of the rotation speed of a computer, and the fan counter 20 sends out the digital signals representing the rotation speed to the embedded micro-controller 30.

In FIG. 1, The output signals of the environment monitoring integrated circuit 1, such as nSMI, nIRQ, nBEEP, nPSB and nRST, are coupled to a computer. The computer can be a personal computer or a work station. The embedded micro-controller 30 has a first output coupled to an interrupt control circuit 40. The interrupt control circuit 40 receives the command from the embedded micro-controller 30 and then outputs two interrupt signals, that is, when the circuit 1 detects the operating parameters exceeds a preset boundary, then the embedded micro-controller 30 announces the interrupt control circuit 40 to output interrupt signals. One of the interrupt signals is the system management interrupt signal (nSMI), with n representing the active low signal. The other interrupt signal is the interrupt request signal (nIRQ). These two interrupt signals from the embedded micro-controller 30 are used to interrupt the operation of the computer when one of the operating parameters exceeds a preset boundary. The circuit 1 also includes a beep control circuit 50 which outputs a beep signal (nBEEP) to the computer, so that the computer sounds an alarm to the user. When one of the operating parameters exceeds a presetting boundary value. The interrupt control circuit 40 and the beep control circuit 50 also receive a chassis intrusion signal. When the computer case is opened, the chassis intrusion signal will be actuated to cause the interrupt control circuit 40 to output an interrupt signal to inform the computer, or the beep control circuit 50 to output a beep signal to alarm the user, so that the user is notified that the case has been opened.

The circuit 1 also includes an ISA/Serial bus interface 60 for reading or writing the relative operating parameters of the computer. The ISA/Serial bus interface 60 is coupled with a set of ISA interface action signals (ISA), a serial bus clock signal (SCL) and a serial bus data signal (SDA). The SCL and SDA are transmitted from the serial bus of the computer. The ISA interface action signals (ISA) include I/O read signal, I/O write signal, data signal, address signal, chip select signal, reset signal, clock signal, among others. The ISA/Serial bus interface 60 acts as a read/write interface for the circuit 1 with the operating voltage, the operating temperature and the fan rotation speed of the computer system. The circuit 1 also includes a set of configuration registers 70 for storing the relative operating parameters. The configuration registers 70 are the limit registers referred to herein. The configuration registers 70 have two outputs, one is a power switch bypass signal (nPSB) and the other one is a reset signal (nRST). The nPSB operates as a "power off" switching signal when the circuit 1 is to turn off the computer. The nRST is used to reset the computer and initialize the operating parameters.

In operation, the embedded micro-controller 30 first selects one operating parameter which may be the operating voltage, the operating temperature or the fan rotation speed. Then, the computer samples the operating parameters and sends these parameters to the analog/digital converter 10 for conversion. The present invention can monitor and control other computer operating parameters, such as the operating current. In such instance, signals representing these other operating parameters can also be input via the ADC 10. The digital signal from the analog/digital converter 10 is then provided to the embedded micro-controller 30. On the other hand, if the computer selects to sample the operating parameter of the fan rotation speed (i.e., the fan input), then the computer sends the parameter to the fan counter 20. The digital signal from the fan counter 20 is also provided to the embedded micro-controller 30. The embedded micro-controller 30 accepts the digital signal from either 10 or 20 and compares the signal with the presetting point of the operating parameter. If the sampled value is greater than the preset boundary value, the embedded micro-controller 30 provides an interrupt signal or a beep output to the computer, as described above, so as to minimize any potential damage to the computer.

Figure 2:
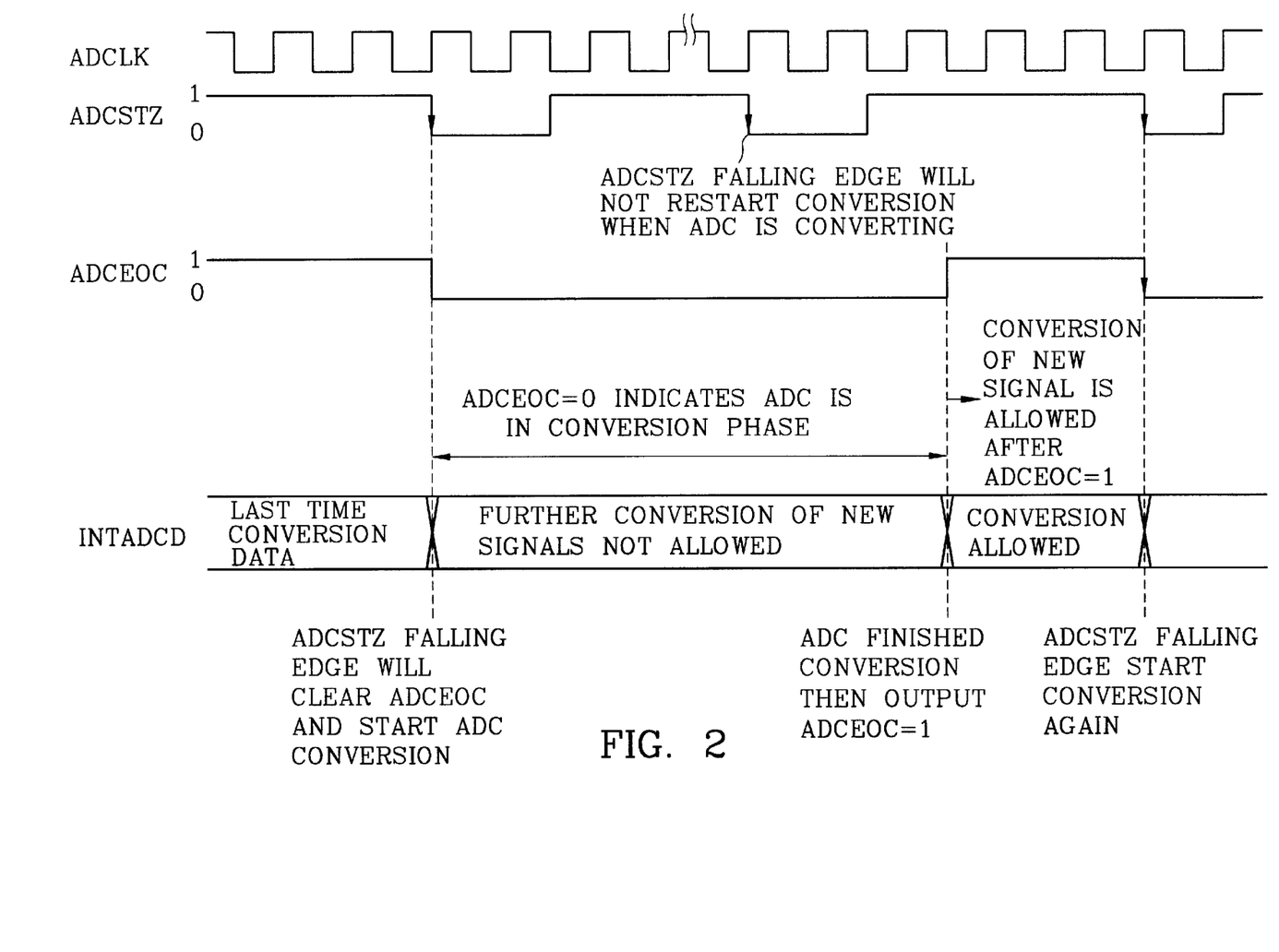
FIG. 2 is a timing diagram showing the operation of an analog/digital converter in the present invention.

FIG. 2 is a timing diagram showing the operation of the analog/digital converter 10 in circuit 1. FIG. 2 illustrates the operation of an analog/digital clock (ADCLK), an analog/digital start signal (ADCSTZ), an analog/digital end signal (ADCEOC) and an internal analog/digital conversion data signal (INTADCD). These four signals are the primary signals of the ADC 10. The numeral "1" in the figure means a high level and the numeral "0" means a low level. Initially, the ADCSTZ signal is in the "1" state. When the ADCSTZ signal becomes active low. As a result, when the ADCSTZ signal goes from high to low, the falling edge of the signal causes the ADC 10 to start converting, i.e., the ADCSTZ signal is changed from high to low via a signal received from the CPU (shown in FIG. 7). In addition, when the ADCEOC signal is in the "1" state, the falling edge of the ADCSTZ signal will also clear the ADCEOC signal to cause the ADCEOC signal to go to the "0" state. The ADCEOC signal being in the "0" state also represents that the ADC 10 is currently converting analog signals. Any further attempt to convert data from a new signal is invalid when the ADC 10 is converting the current analog signal, because the current action of the conversion has not been completed. Even the falling edge of the ADCSTZ signal when the ADC 10 is converting will not cause the ADC 10 to re-start conversion of a new signal. When the ADC 10 completes the conversion of an analog signal, the ADCEOC signal will be changed into the "1" state from the "0" state. At this time, the conversion of data by the ADC 10 will be allowed again, and if the falling edge of the ADCSTZ signal occurs again, the ADC 10 will begin the conversion of the next analog signal.

Figure 3:
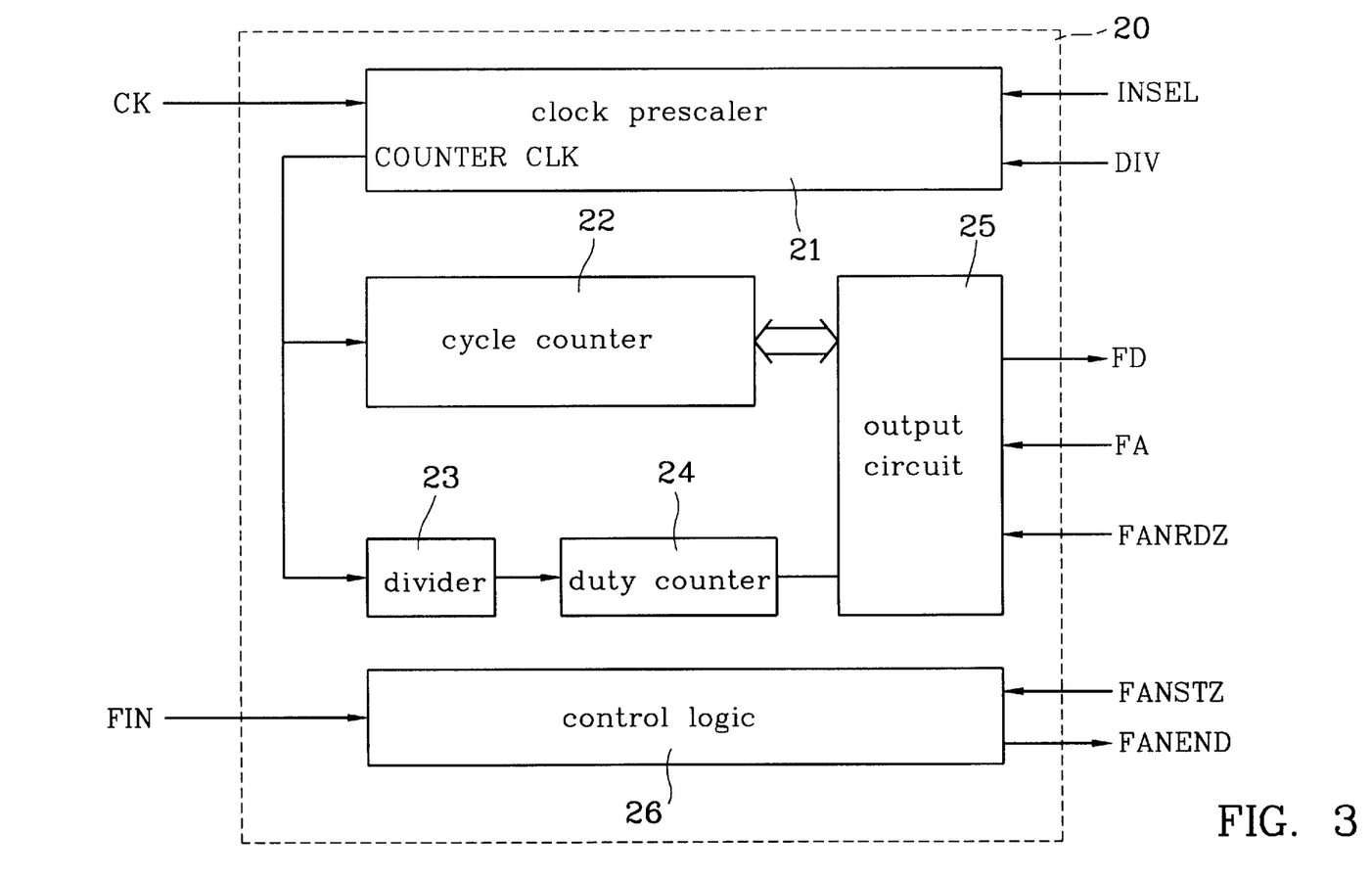
FIG. 3 is a schematic block diagram of a fan counter in accordance with the present invention.

FIG. 3 is a schematic block diagram of the fan counter 20 in circuit 1. The fan counter 20 operates to process the received fan input (FIN) signal from the sensor (shown in FIG. 7) to obtain a digital fan rotation speed signal (FD). The fan counter 20 includes a clock prescaler 21 used to pre-divide the clock for a cycle counter 22 and a divider 23 described below. The clock prescaler 21 receives a clock (CK), a selecting sample signal (INSEL) and a divide signal (DIV), and then outputs the pre-divided clock. The INSEL and the DIV signals are provided by the CPU (shown in FIG. 7). The INSEL signal is used as a basis sampling signal, and together with the DIV signal, operates to divide the clock (CK). The output of the clock prescaler 21 is the COUNTER CLK coupled to a cycle counter 22 and a divider 23. The cycle counter 22 is used to count the cycle of the rotation speed of the fan, and the divider 23 is further used to divide the clock into a new frequency for a duty counter 24. In the current embodiment, the cycle counter 22 can be a 12-bit counter, and the divider 23 can be a 1/16 divider. The output of the divider 23 is coupled to the duty counter 24 for counting the working duty cycle of the fan counter 20. The duty counter 24 can be an 8-bit counter in the current embodiment. The cycle counter 22 and the duty counter 24 are both coupled to a output circuit 25 which includes an output multiplexer & a tri-state buffer. The output circuit 25 receives a rotation speed address signal (FA) and an enable signal of reading rotation speed (FANRDZ), and together with the outputs from the cycle counter 22 and the duty counter 24, outputs a data signal representing the fan rotation speed (FD). Thus, the output circuit 25 is used to produce the fan rotation speed (FD) data that is provided to the embedded micro-controller 30.

The function of the FA signal is to indicate the address of the rotation speed signal, and the function of the FANRDZ signal is an enable signal for reading a sample of the rotation speed. The fan counter 20 also includes a control logic circuit 26. One input signal of the logic circuit 26 is a fan rotation speed signal (FIN), the other one is a start count signal (FANSTZ). The control logic circuit 26 receives the two signals as a reference data, then outputs a fan count end signal (FANEND) which informs the embedded micro-controller 30 that the counting of the rotation speed has been completed. When the FANEND signal is generated, the embedded micro-controller 30 can grasp the actual rotation speed of the fan at that instant of time.

Figure 4:
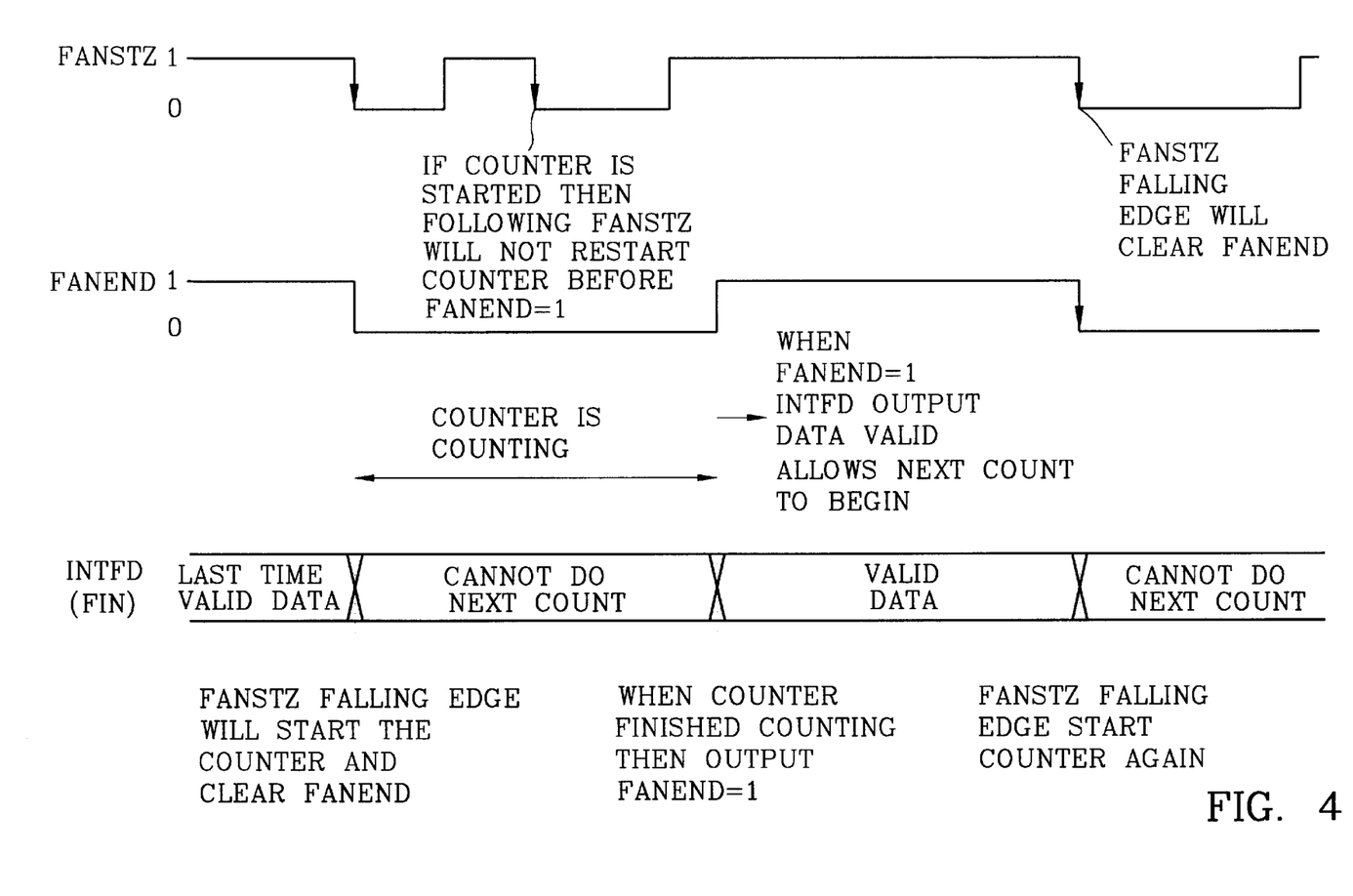
FIG. 4 is a timing diagram showing the operation of a fan counter in the present invention.

FIG. 4 is a timing diagram showing the operation of the fan counter 20 of FIG. 1. FIG. 4 illustrates the operation of a fan count start signal (FANSTZ), a fan count end signal (FANEND), and an internal fan data signal (INTFD). These three signals are the main signals of the fan counter 20. The numeral "1" in FIG. 4 means a high level and the numeral "0" means a low level. Initially, the FANSTZ signal is in the "1" state. When the FANSTZ signal becomes active low. As a result, when the FANSTZ signal goes from high to low, the falling edge of the signal causes the cycle counter 22 to start counting, i.e., the FANSTZ signal is changed from high to low via a signal received from the CPU (shown in FIG. 7). In addition, when the FANEND signal is in a "1" state, the falling edge of the FANSTZ signal will also start the cycle counter 22 and clear the FANEND signal, causing the FANEND signal to fall to the "0" state. The FANEND signal being in the "0" state represents that the fan counter 20 is currently counting. The further increase of the count in the fan counter 20 is not allowed when the fan counter 20 is doing the counting, because the counting action has not been completed. Therefore, the subsequent falling edge of the FANSTZ signal will not cause the fan counter 20 to start doing the counting. When the fan counter 20 completes the counting, the FANEND signal will be changed to the "1" state from the "0" state. At this time, the fan counter 20 will be allowed to perform the next counting again, and if the falling edge of the FANSTZ signal is started again, the fan counter 20 will be ready to initiate another count operation.

Figure 5:
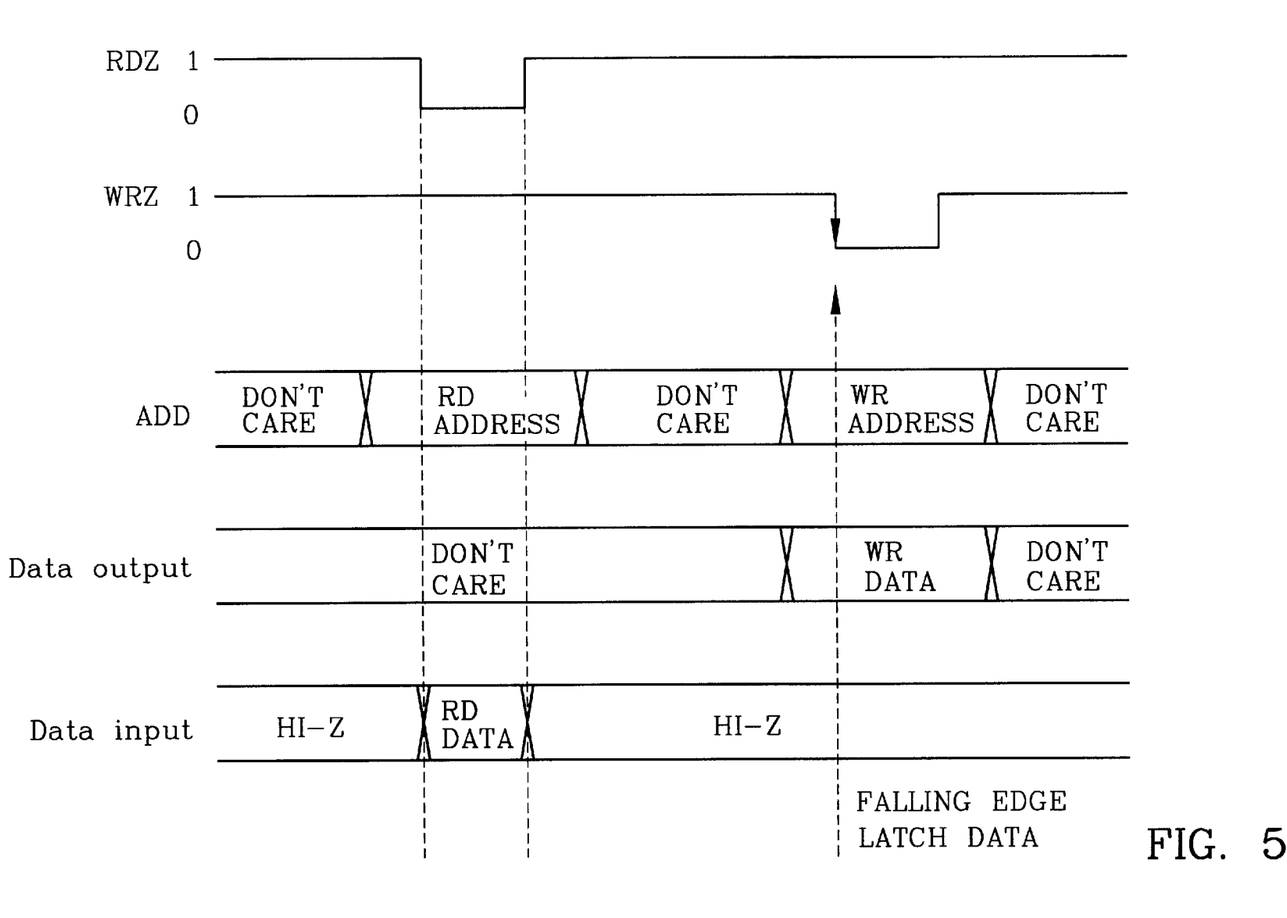
FIG. 5 is a timing diagram showing the read/write action operation of a micro-controller in the present invention.

FIG. 5 is a timing diagram showing the effect of the read/write operation of the embedded micro-controller 30 in FIG. 1, and in particular, the operation of a read signal (RDZ), a write signal (WRZ), an address signal (ADD), data output and data input. The RDZ signal is an enable signal which represents that the embedded micro-controller 30 is reading an operating parameter of one of the blocks in the circuit 1, for example, either the fan counter 20 or ADC 10. The WRZ signal is an enable signal which represents that the embedded micro-controller 30 is writing a new operating parameter into one of the two blocks. The ADD signal represents he address of the relative operating parameters. The data output is the data outputted from the embedded micro-controller 30, and the data input is the data input into the embedded micro-controller 30.

The two main states of the ADD are the read and write states. When the RDZ signal is in the "0" state and the WRZ signal is in the "1" state, the ADD signal will be in the "read address" state. At this time, the data output is in "don't care" state, and the data input is in a "read data" state, so that the embedded micro-controller 30 is reading data. When the RDZ signal is in the "1" state and the WRZ signal is in the "0" state, the ADD signal will be in the "write address" state. At this time, the data output is in "write data" state, and the data input is in the high impedance state, so that the embedded micro-controller 30 is writing data. Further, the embedded micro-controller 30 will use the falling edge of the WRZ signal to latch the data, that is currently being written. When the RDZ signal is in the "1" state and the WRZ signal is also in the "1" state, both the ADD signal and the data input will be in the "don't care" state, the data input will be in the high impedance state. Finally, the HI-Z is the high impedance which represents a third state of the transistor other then the on and off states.

Figure 6:
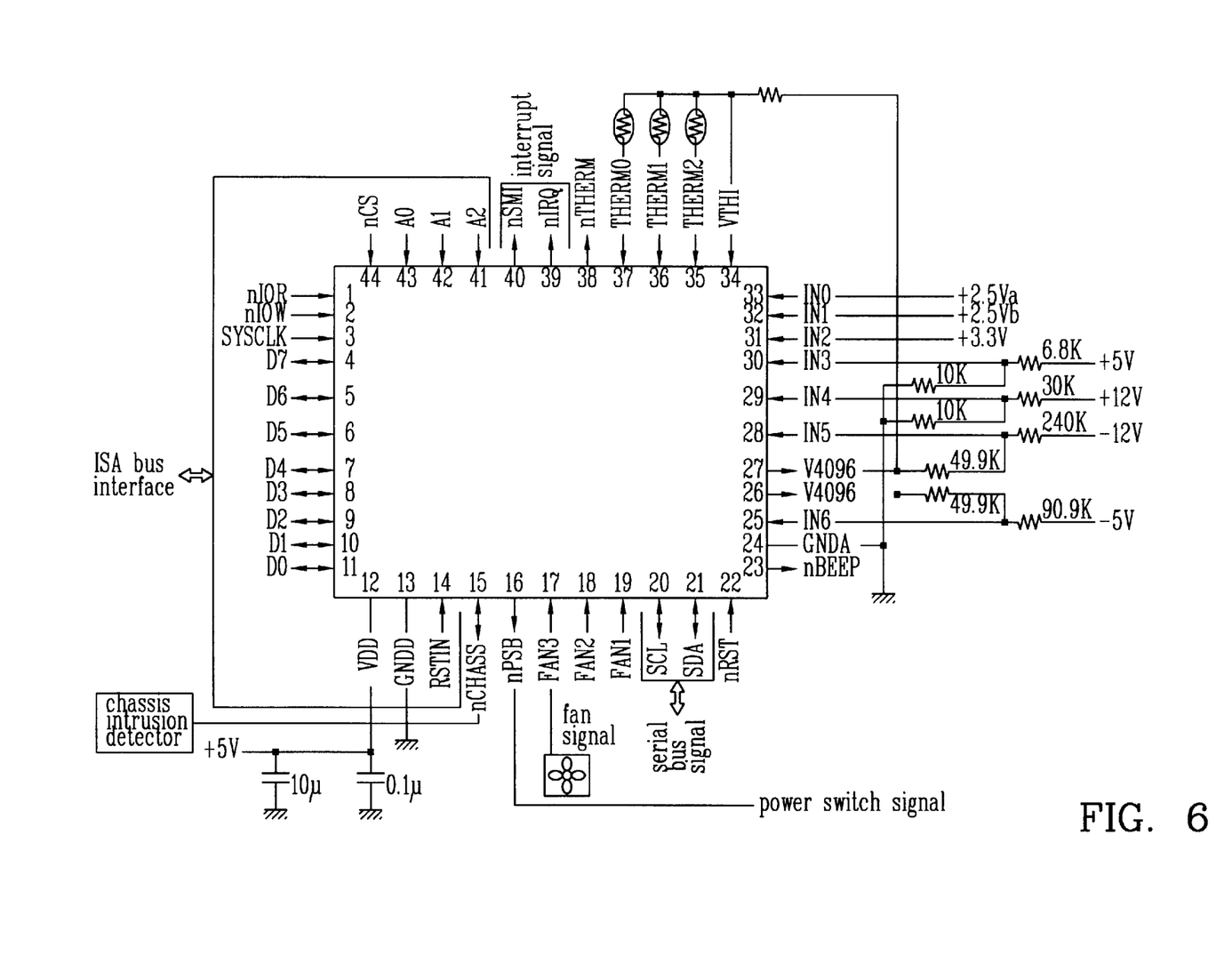
FIG. 6 is an application illustration of an embodiment according to the present invention.

FIG. 6 illustrates an example of a complete integrated circuit that may be used for the present invention as contrasted with FIG. 1. Pins 1 to 14 and pins 41 to 44 can form the ISA bus interface of FIG. 1. Pins 39, 40 can form the interrupt signal which represent the nSMI signal and the nIRQ signal respectively, shown in FIG. 1. Pins 34 to 38 can form the thermal input signal shown in FIG. 1. Pins 25 and 28 to 33 can form the voltage input shown in FIG. 1. The resistors in the FIG. 6 can be the voltage divided resistors. The pin 24 can be the ground signal. The pin 23 can be the NBEEP signal shown in FIG. 1. The pin 22 can be the nRST signal shown in FIG. 1. The pins 20, 21 can be the serial bus signal which represents the SDA signal and SCL signal, respectively, shown in FIG. 1. The pins 17 to 19 can form the fan signal which represents the fan input shown in FIG. 1. The pin 16 can be the power switch signal representing the nPSB shown in FIG. 1. The pin 15 can be a nCHASS signal coupled to a chassis intrusion detector. The chassis intrusion detector is used to detect whether the computer case has been opened. The nCHASS signal can be the chassis intrusion signal shown in FIG. 1.

Figure 7:
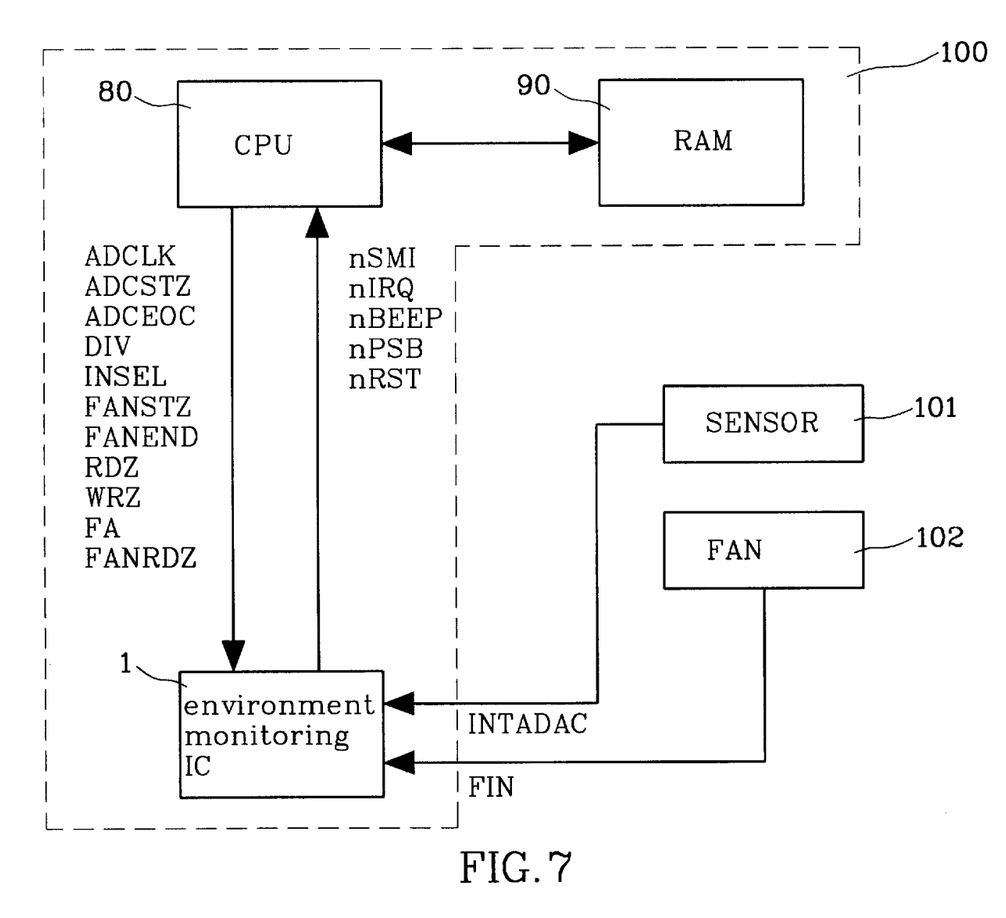
FIG. 7 is a system diagram illustrating how the circuit of the present invention is coupled to the other components of the computer.

FIG. 7 illustrates the circuit 1 coupled to the CPU 80 in the computer 100 and coupled with a sensor 101 and a fan 102. The signals that the CPU command the circuit 1 are ADCLK, ADCSTZ, ADCEOC, DIV, INSEL, FANSTZ, FANEND, RDZ, WRZ, FA and FANRDZ. The signals transmitted from the circuit 1 to the CPU 80 are the nSMI, nIRQ, nBEEP, nPSB and nRST. So we can more clear to understand the relationship between the FIG. 1 and the other figures. The sensor 101 is used to sense the operating voltage or operating temperature of the computer 100, which sends the INTADAC signal to the circuit 1. The fan 102 can be installed in the computer 100, which sends the FIN to the circuit 1. The computer 100 further includes a RAM 90 acted as a data memory for the computer 100.

These advantages may also be applied to special application integrated circuits, where it may be useful to allow frequent amendment of the preset parameters of the integrated circuit.

While this invention has been described in connection with what is presently considered to be the most practical and preferred embodiment, it is to be understood that the invention is not limited to the disclosed embodiments, but on the contrary, it is intended to cover various modifications and equivalent arrangements included within the spirit and scope of the appended claims.

I claim:

1. A computer environment monitoring device for monitoring certain operating parameters within a computer system, the monitoring device comprising:

a microcontroller including a processor for executing program codes, a program memory for storing program codes executed by the processor, and a data memory for storing data;

an input circuit for receiving inputs representing the conditions of certain operating parameters, the input circuit providing a plurality of outputs to the microcontroller representative of the conditions of the received operating parameters;

an interface circuit for communication with other devices in the computer system;

a plurality of registers, coupled to the interface circuit, for storing present boundary conditions for each operating parameter; and an interrupt control circuit coupled to the microcontroller for generating an interrupt signal if a received condition exceeds a preset boundary of the corresponding operating parameter.

2. The computer environment monitoring device of claim 1, wherein the operating parameters include the voltage in the computer system, the temperature in the computer system, and the speed of the computer fan in the computer system.

3. The computer environment monitoring device of claim 2, wherein the voltage input represents the operating voltage of the computer system, and the thermal input represents the operating temperature of the computer system.

4. The computer environment monitoring device of claim 1, further including an alarm circuit coupled to the microcontroller for generating an alarm signal if a received condition exceeds a preset boundary of the corresponding operating parameter.

5. The computer environment monitoring device of claim 4, wherein the alarm circuit is a beep control circuit for generating a beep signal if a received condition exceeds a preset boundary of the corresponding operating parameter.

6. The computer environment monitoring device of claim 1, wherein the input circuit includes an analog-to-digital converter having a voltage input for receiving voltage input, and a thermal input for receiving temperature input, wherein the analog-to-digital converter converts the received inputs into digital signals for transmission to the microcontroller.

7. The computer environment monitoring device of claim 1, wherein the input circuit includes a fan counter for determining the rotation speed of the fan of the computer system, and for providing the determined rotation speed to the microcontroller.

8. The computer environment monitoring device of claim 7, wherein the fan counter further including:
   a clock prescaler coupled to a clock, a selecting sample signal and a divide signal for predividing the clock to the other circuit;
   a cycle counter coupled to the clock prescaler for counting the cycle of the fan rotation speed;
   a divider coupled to the clock prescaler for further dividing the clock to next stage;
   a duty counter coupled to the divider for counting the working duty of the fan counter;
   an output circuit coupled to an address signal, an enable signal, the duty counter and the cycle counter for outputting a fan rotation speed data;
   a control logic having a first input coupled to a fan rotation speed signal and a second input coupled to a fan start rotation signal for outputting a fan counting ended signal.

9. The computer environment monitoring device of claim 8, further comprising an output multiplexer and a tri-state buffer both in the output circuit.

10. The computer environment monitoring device of claim 1, further including a chassis intrusion signal coupled to the interrupt control circuit.

11. The computer environment monitoring device of claim 1, wherein the plurality of registers further includes two outputs, one is a power switch bypass signal and the other one is a reset signal.

12. A computer environment monitoring device for monitoring certain operating parameters within a computer system, the monitoring device comprising:

a microcontroller including a processor for executing program codes, a program memory for storing program codes executed by the processor, and a data memory for storing data;

an input circuit for receiving inputs representing the conditions of certain operating parameters, the input circuit providing a plurality of outputs to the microcontroller representative of the conditions of the received operating parameters;

an interface circuit for communication with other devices in the computer system;

a plurality of registers, coupled to the interface circuit, for storing preset boundary conditions for each operating parameter; and an alarm circuit coupled to the microcontroller for generating an alarm signal if a received condition exceeds a preset boundary of the corresponding operating parameter.

13. The computer environment monitoring device of claim 12, wherein the operating parameters include the voltage in the computer system, the temperature in the computer system, and the speed of the computer fan in the computer system.

14. The computer environment monitoring device of claim 12, wherein the input circuit includes an analog-to-digital converter having a voltage input for receiving voltage input, and a thermal input for receiving temperature input, wherein the analog-to-digital converter converts the received inputs into digital signals for transmission to the microcontroller.

15. The computer environment monitoring device of claim 12, wherein the input circuit includes a fan counter for determining the rotation speed of the fan of the computer system, and for providing the determined rotation speed to the microcontroller.

16. The computer environment monitoring device of claim 12, further including a chassis intrusion signal coupled to the alarm circuit.

17. The computer environment monitoring device of claim 12, wherein the plurality of registers further includes two outputs, one is a power switch bypass signal and the other one is a reset signal.

18. The computer environment monitoring device of claim 12, further including an interrupt control circuit coupled to the microcontroller for generating an interrupt signal if a received condition exceeds a preset boundary of the corresponding operating parameter.

19. The computer environment monitoring device of claim 12, wherein the alarm circuit is a beep control circuit for generating a beep signal if a received condition exceeds a preset boundary of the corresponding operating parameter.

20. A computer environment monitoring device for monitoring certain operating parameters within a computer system, the monitoring device comprising:

a microcontroller including a processor for executing program codes, a program memory for storing program codes executed by the processor, and a data memory for storing data;

an input circuit for receiving inputs representing the conditions of certain operating parameters, the input circuit providing a plurality of outputs to the microcontroller representative of the conditions of the received operating parameters;

an interface circuit for communication with other devices in the computer system;

a plurality of registers, coupled to the interface circuit, for storing preset boundary conditions for each operating parameter; and an alarm circuit coupled to the microcontroller for generating an alarm signal if a received condition exceeds a preset boundary of the corresponding operating parameter;

an interrupt control circuit coupled to the microcontroller for generating an interrupt signal if a received condition exceeds a preset boundary of the corresponding operating parameter.

\* \* \* \* \*